US011386368B1

(12) United States Patent
Schneider (10) Patent No.: US 11,386,368 B1
(45) Date of Patent: Jul. 12, 2022

(54) METHOD FOR MATCHING STUDENTS WITH TEACHERS TO ACHIEVE OPTIMAL STUDENT OUTCOMES

(71) Applicant: John Schneider, Mason, OH (US)

(72) Inventor: John Schneider, Mason, OH (US)

( * ) Notice: Subject to any disclaimer, the term of this patent is extended or adjusted under 35 U.S.C. 154(b) by 0 days.

(21) Appl. No.: 17/686,600

(22) Filed: Mar. 4, 2022

(51) Int. Cl.
*G06Q 10/06* (2012.01)
*G06Q 50/20* (2012.01)

(52) U.S. Cl.
CPC ..... *G06Q 10/063118* (2013.01); *G06Q 50/20* (2013.01)

(58) Field of Classification Search
None
See application file for complete search history.

(56) References Cited

U.S. PATENT DOCUMENTS

| | | | | |
|---|---|---|---|---|
| 10,664,876 | B1* | 5/2020 | Eyal | G06Q 30/0276 |
| 11,036,770 | B2* | 6/2021 | Gostelow | G06F 40/226 |
| 2002/0013836 | A1* | 1/2002 | Friedman | G09B 5/00 |
| | | | | 705/7.35 |
| 2002/0184215 | A1* | 12/2002 | Greene | G09B 7/00 |
| 2003/0113698 | A1* | 6/2003 | Von der Geest | G09B 19/00 |
| | | | | 434/322 |
| 2004/0009461 | A1* | 1/2004 | Snyder | G09B 7/02 |
| | | | | 434/350 |
| 2005/0055256 | A1* | 3/2005 | Scott | G06Q 10/109 |
| | | | | 705/321 |
| 2008/0176194 | A1* | 7/2008 | Zolt | G09B 7/08 |
| | | | | 434/178 |
| 2013/0212507 | A1* | 8/2013 | Fedoseyeva | G06F 3/04842 |
| | | | | 715/765 |
| 2014/0024007 | A1* | 1/2014 | Mahadevan | G09B 5/08 |
| | | | | 434/350 |
| 2014/0272908 | A1* | 9/2014 | Black | G09B 5/08 |
| | | | | 434/362 |

(Continued)

FOREIGN PATENT DOCUMENTS

CN 112132525 A * 12/2020

OTHER PUBLICATIONS

Jia et al. "A Conceptual Artificial Intelligence Application Framework in Human Resource Management" (2018) (Year: 2018).*

*Primary Examiner* — Sujay Koneru (57) ABSTRACT

Techniques are provided for the optimal matching of teachers to students using machine learning models and analysis engines (MLMAEs). In an embodiment, historical and biographical teacher and student data is collected through a data ingestion layer. As the data is ingested, a process is spawned that automatically builds MLMAEs using a plurality of algorithms. The MLMAEs are automatically tested for accuracy, and the MLMAE with the highest level of accuracy is promoted as the winner. Students enter information through a user interface to request optimal teachers for a subject area, and this information is run against the winning MLMAE which returns a list of optimal teachers. Also provided are techniques for teachers to enter their availability, techniques for MLMAE creators to seamlessly test prospective new MLMAEs, and techniques for teachers to understand why they are not matches for specific segments of students and to receive associated professional development resources.

12 Claims, 9 Drawing Sheets

(56) References Cited

U.S. PATENT DOCUMENTS

| | | | | |
|---|---|---|---|---|
| 2015/0356699 | A1* | 12/2015 | Velozo | G06Q 10/063112 |
| | | | | 705/326 |
| 2016/0042651 | A1* | 2/2016 | Joao | G09B 19/00 |
| | | | | 434/309 |
| 2016/0042654 | A1* | 2/2016 | Fieldman | G09B 5/06 |
| | | | | 434/362 |
| 2017/0243312 | A1* | 8/2017 | Smith | G06Q 50/2057 |
| 2017/0337838 | A1* | 11/2017 | Elkon | G06F 3/013 |
| 2018/0286267 | A1* | 10/2018 | Govil | G09B 5/12 |
| 2019/0138614 | A1* | 5/2019 | Shen | G06N 7/005 |
| 2020/0082056 | A1* | 3/2020 | Hasegawa | G06F 21/54 |
| 2020/0098073 | A1* | 3/2020 | Le, Jr. | G09B 5/14 |
| 2020/0334520 | A1* | 10/2020 | Chen | G06N 3/088 |
| 2020/0380417 | A1* | 12/2020 | Briancon | G06F 8/315 |
| 2020/0410455 | A1* | 12/2020 | Aviñó | H04N 7/15 |
| 2021/0027644 | A1* | 1/2021 | Wycoff | H04L 9/3239 |
| 2021/0043100 | A1* | 2/2021 | Shaaban | G09B 5/12 |
| 2021/0065053 | A1* | 3/2021 | Higgins | G06K 9/6218 |
| 2021/0065574 | A1* | 3/2021 | Shipman | G06Q 30/0601 |
| 2021/0150407 | A1* | 5/2021 | Xu | G06N 5/02 |
| 2021/0216560 | A1* | 7/2021 | Power | G06F 16/9032 |
| 2021/0241179 | A1* | 8/2021 | Karanth | G06N 7/005 |
| 2021/0326746 | A1* | 10/2021 | Dayama | G06N 5/003 |
| 2021/0366066 | A1* | 11/2021 | Davies | G09B 5/14 |
| 2021/0374279 | A1* | 12/2021 | Zheng | G06N 5/022 |
| 2022/0004921 | A1* | 1/2022 | Balaraman | G06K 9/6226 |
| 2022/0078083 | A1* | 3/2022 | Kylväjä | H04L 41/0823 |
| 2022/0094709 | A1* | 3/2022 | Sharma | G06K 9/6257 |
| 2022/0138566 | A1* | 5/2022 | Lan | G06N 3/08 |
| | | | | 706/25 |

\* cited by examiner

METHOD FOR MATCHING STUDENTS WITH TEACHERS TO ACHIEVE OPTIMAL STUDENT OUTCOMES

BACKGROUND OF THE INVENTION

This invention relates to matching students with teachers using a method that provides optimal knowledge outcomes for students.

Teacher capability, teaching style, and experience have an oversized impact on a student's ability to master a given subject matter and be successful in the classroom. Similarly, each student has different learning styles, different backgrounds, and many other factors that can lead to how well they can comprehend a given subject matter being taught by a teacher. However, students are typically assigned to teachers based solely on scheduling algorithms or techniques unrelated to optimizing the knowledge of the student, with no account taken for all the key factors that determine subject mastery success. For example, in public K-12 school districts, a computer scheduling system is typically used to match teacher availability with students for their selected courses, with the only considerations being time slots available for the teacher, and whether the teacher is certified to teach the grade-level and course. No technique that is grounded in proven teacher capability with specific students is used to determine which teachers should be matched with which students. Charter schools, private schools, adult continuing education, online educational programs, and company training programs all suffer from this major deficiency.

Optimizing student learning is important. Graduation and retention rates, especially those in urban school systems, are low, which has substantial consequences. Increased educational attainment by students has been shown to substantially increase the opportunity for the student to earn a higher income and gain access to better living conditions, healthier foods, and health care services. In addition, an increase in high school graduation rates has the potential to improve overall population health.

With the advent of remote learning, a method to optimally match students with teachers is even more important, as students now have the capability to be taught by anyone in the world. In many instances, students will give up on learning because they think they are incapable of mastering a given subject area, when in fact it is just a matter of finding a teacher from whom they can learn most effectively. However, a method does not exist to effectively match students with the teachers from which they can learn most effectively.

In addition, a continuous problem that is encountered is how to effectively retrain workers for new roles as current jobs become obsolete due to technology or other factors. It is estimated that over 50% of current work is completely automatable using existing technology. However, retraining workers to use new technology or to enter a completely different field after their position has been automated is highly challenging and has historically failed. One of the key reasons for this difficulty is because there does not exist a method to optimally align trainers with workers undergoing a role change, and workers give up or fail because they are not being taught by an instructor that can most effectively retrain them based on their specific needs.

Optimally matching students with teachers also has substantial benefits for teachers. First, teachers want their students to be successful in learning from them, and many teacher evaluation systems are focused on how effective teachers are imparting key learning objectives to students. Teacher effectiveness is often measured by students taking standardized tests and by the student's grades in the classroom. With better student outcomes in each class, teachers are likely to have a higher satisfaction rate with their job and receive promotions and salary increases more frequently. In addition, because the students in a teacher's classroom (in-person or online) are optimally matched with the teacher, the teacher will typically have the ability to go into further depth on subject matters that they would otherwise not have the opportunity to approach. This provides students with increased knowledge of a subject matter, allowing them to perform better on standardized tests and on classroom assignments. Another positive effect for teachers who are matched with students via an optimal method is that teachers will gain insight into why they are being matched with specific students, and why they are not being matched with other students. This, in turn, will allow them to focus their own professional development initiatives on learning different teaching techniques to increase the type of students they can effectively teach, allowing them to grow and expand in their job.

Matching students with teachers for optimal student outcomes is difficult, and no method exists to do this. One of the difficulties lies in determining what factors and data would be necessary to create such a method. Due to this, the method needs to be highly flexible to allow for emerging factors that might affect student outcomes, as well as be able to seamlessly incorporate new data and determine if it is more effective at optimally matching students with teachers. This complexity is a significant barrier, and because of this the only data with existing methods that is taken into account is focused on what timeslots are available for the teacher and the student.

Analyzing data on historical student outcomes with given teachers, student and teacher demographic data, and other meaningful information that is required to optimally match students with teachers is highly challenging, and a method to do this does not exist. The method required would need to automatically look at multiple changing datasets, automatically create a plurality of analysis engines (machine learning models, for example), and then automatically test the analysis engines with existing known data to determine quality and effectiveness of the results. Finally, the output of the analysis engines must be merged and presented to end users in a highly consumable fashion, allowing students to be optimally matched with teachers. Because of the high complexity involved, a method to perform the above does not exist.

SUMMARY OF THE INVENTION

A method for determining the optimal teacher match for a given student is provided.

The method is comprised of a data ingestion layer that collects all data that may be relevant (though non-obvious) in determining an optimal teacher/student match. This data is cleansed, validated, stored, and allowed to be continuously updated as data becomes available. Examples of student related data include student demographic information, previous school records, learning style assessment results, work experience, skills, etc. Examples of teacher related data include historical student lists, their student's grades and results on standardized tests, their previous student's learning style assessment results, demographics, skills, etc. An important note is that the method described provides for a highly flexible set of data to be used because the method incorporates advanced machine learning (ML)

algorithms and other types of analysis engines that make connections of seemingly unrelated data.

Once, and continuously as data is ingested, a process is automatically kicked off that builds ML models and other types of user-specified analysis engines against the data. Note that ML models can be constructed by a plurality of algorithms, including linear regression, support vector machine, naïve bayes, logistic regression, K-nearest neighbors, decision trees, random forest, gradient boosted decision trees, K-means clustering, hierarchical clustering, DBSCAN clustering, artificial neural networks, deep learning, etc., and the method defined in this invention supports all types of algorithms. Analysis engines refers to any non-ML based algorithm that can be used to determine probabilistic outcomes. Analysis engines can be source code, object code, executables, etc.

The process automatically runs tests against the ML models and analysis engines to determine accuracy and performance. If the accuracy and performance of a given ML model or analysis engine is greater than the current one in place, the existing ML model or analysis engine is automatically and seamlessly replaced with the new one.

The method provides a way for students to find their optimal teachers for a given subject area. A graphical user interface is provided that allows students to upload relevant information into a datastore, and this data is then automatically run against the current best ML model/analysis engine. A report is then returned to the student of the optimal teacher matches, timeslots of availability for each match, and a way to reserve the desired timeslot(s) and teachers.

The method provides a way for teachers to use a graphical user interface to upload their availability into a datastore. In addition, it also provides a way for teachers to learn and understand why they are not matches for specific segments of students, and automatically provides professional development recommendations and resources to improve their teaching to become matches in the future.

The method provides a way for developers or ML subject matter experts to create, upload, and test prospective new ML models and analysis engines. A user is provided a graphical user interface that allows them to upload code (object, binary, etc.), models or model definitions, configurations, and test data. The process then automatically tests the prospective new ML models and analysis engines to make sure they can be built and are functional. After these tests are successfully completed, the process then automatically runs the prospective new ML model or analysis engine using current data to determine accuracy.

DETAILED DESCRIPTION OF THE INVENTION

Before describing in detail at least one embodiment of the invention, it is to be understood that that invention is not limited in its application to the details of construction and the arrangement of the components set forth in the following description or illustrated in the drawings. The invention is applicable to other embodiments and/or may be practiced or carried out in various ways. It should also be understood that the terminology used herein is for the purpose of description and should not be regarded as limiting.

Figure 1:
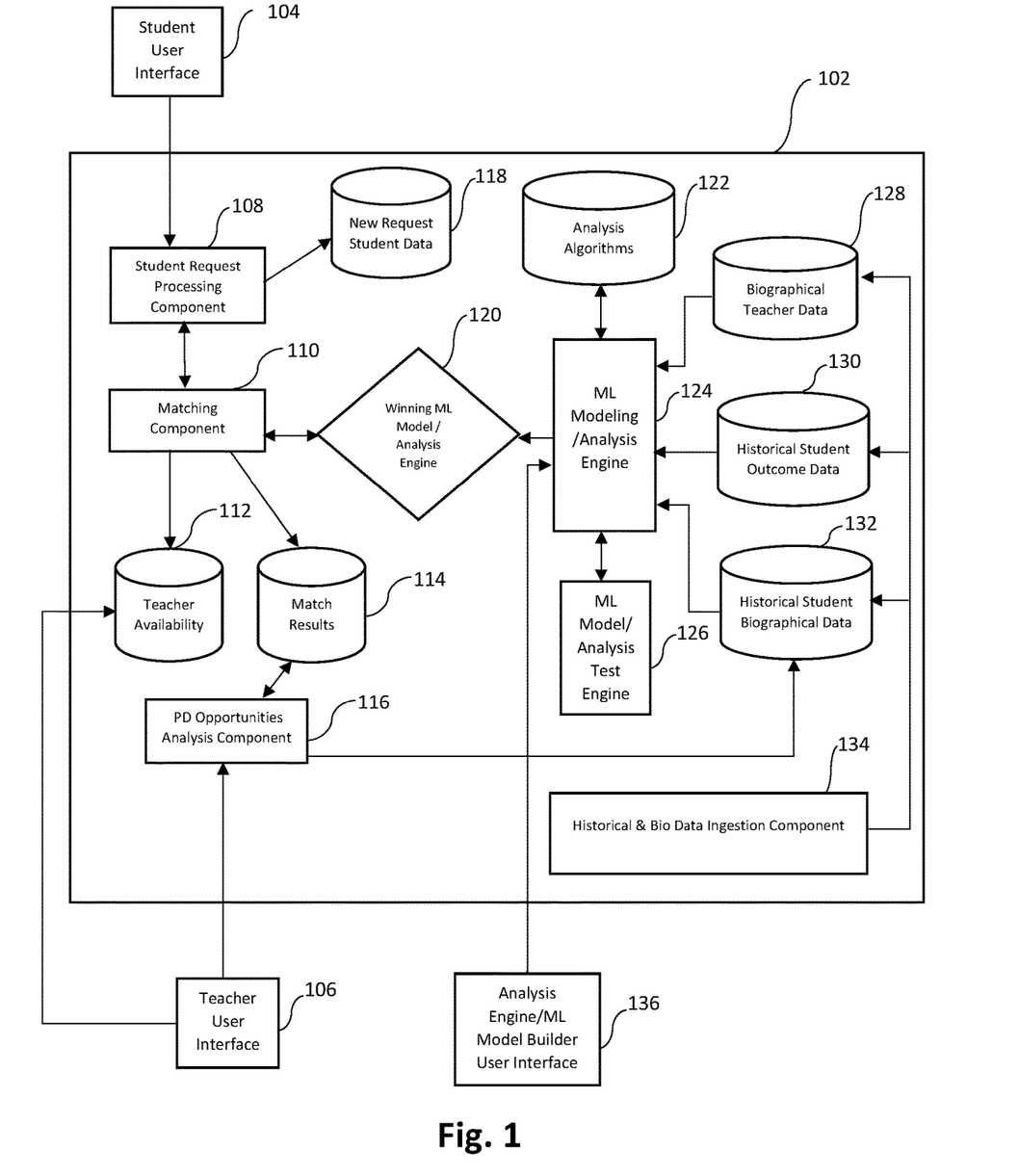
FIG. 1 is a block diagram illustrating an overview of the components required in an exemplary embodiment of the invention.

FIG. 1 illustrates a single exemplary embodiment of the overall component architecture. The components of FIG. 1 are connected by a communication network, examples of which can be, but are not limited to, a LAN, a WAN, WIFI, Fiber, Internet, etc. The components can each reside on a single computer server, multiple computer servers, one or many containers, one or many virtual machines, one or many devices, On Premise, in the Cloud, in a Hybrid Cloud, etc.

According to this embodiment, the processing subsystem 102 is responsible for providing data exchange interfaces (such as APIs, file system, consoles, https, etc.) to users and data providers, performing a plurality of analysis engine and machine learning (ML) modeling/creation, cleansing and storing data, and performing the optimal matching of students to teachers. Data from various sources is ingested and cleansed by the Historical & Bio Data Ingestion Component (Data Processing Component) 134. This component is flexible and receives, validates, cleanses, maps, and processes data from disparate sources such as student information systems, delimited files, standardized test scores, teacher assessments, manual input, teacher information systems, etc. The Biographical Teacher Data component 128 receives cleansed teacher data from the Data Processing Component 134 and stores it for retrieval and analysis. Examples of biographical teacher data can include history of courses taught, history of students taught, teaching certifications, teaching skills, demographic data, etc.

The Historical Student Outcome Data component 130 receives cleansed student outcome data from the Data Processing component 134 and stores it for retrieval and analysis. Examples of historical student outcome data can include student courses taken, student grades, student scores on exams, student scores on standardized tests, learning style assessment results, the teacher for each course, etc. The Historical Student Biographical Data component 132 receives cleansed student biographical data from the Data processing Component 134 and stores it for retrieval and analysis. Examples of historical student biographical data include demographic information, technology available to the student, economic information, address history, etc.

The ML Modeling/Analysis Engine component (MMAE) 124 performs several duties. First, it determines if there is new data to analyze. It checks for new data across the Biographical Teacher Data component 128, the Historical Student Outcome Data component 130, and the Historical Student Biographical Data component 132. When a quantity of new data is detected, the MMAE 124 then interrogates the Analysis Algorithms component 122 to determine what ML models and/or analysis engines should be employed against the data, and how to employ them. The MMAE 124 then builds and deploys each ML model and/or analysis engine described in the Analysis Algorithms component 122, checking and recording errors as it iterates through each.

After each ML Model and/or analysis engine is deployed, the MMAE 124 notifies the ML Model/Analysis Test Engine component (MMATE) 126 that is has work to do and passes to it the instructions necessary to perform accuracy tests against each ML model and analysis engine. The MMATE 126 performs the tests, logging any errors and passing back the performance and accuracy results of each test to the MMAE 124. The MMAE 124 then saves the results of each test to the Analysis Algorithms component 122.

After all tests have been executed by the MMATE 126, the MMAE 124 then fetches all the test results from the Analysis Algorithms component 122. From this dataset, the MMAE 124 then determines which ML model or analysis engine had the top performance/accuracy results (Potential Top Performer) and compares these values to the performance/accuracy results of the current Winning ML Model/Analysis Engine component 120. If the performance/accuracy results of the Potential Top Performer is greater than the performance/accuracy results of the Winning ML Model/Analysis Engine component 120, then the MMAE 124 moves the Potential Top Performer ML model/analysis engine into the Winning ML Model/Analysis Engine component 120, and removes the existing ML model or analysis engine.

The Analysis Engine/ML Model Builder User Interface component 136 allows the user (typically a software developer or data scientist) to upload and test new prospective ML models or analysis engines on processing subsystem 102. Note that the user interface can be built using a variety of different technologies and platforms, such as a web user interface, an app that runs on phones/tablets/other devices, APIs, etc. The Analysis Engine/ML Model Builder User Interface component 136 accepts from the user one or more of the following files or pointers: configuration files, dummy test data, software code (source, object, binary, etc.), ML models, ML algorithms, instruction sets. The files and/or pointers are received by the MMAE 124, which parses and stores the files in the Analysis Algorithms component 122. The Analysis Engine/ML Model Builder User Interface 136 allows the user to kick off builds of their new ML models and analysis engines, test the results on the dummy test data provided, and receive back the results. Users can also edit, update, and delete existing uploaded ML models and analysis engines through this interface.

A student uses the Student User Interface component 104 to request and receive an optimal match with one or more teachers. The Student User Interface component 104 can be one of a myriad of technologies, including a web user interface, an app that runs on phones/tablets/other devices, APIs, etc. The student enters in the information required into the Student User Interface component 104, typically examples of which are student name, a unique identifier (student number, employee number, etc.), subject area(s), location preference (online, in person, specific location, etc.), demographic data, learning styles, etc. The request is then passed to the Student Request Processing Component 108 which stores the data in the New Request Student Data component 118. By storing the data in the New Request Student Data component 118, this allows future requests from the same student to require much less information to be entered for future teacher matching requests.

Once the student request data is logged to the New Request Student Data component 118, the Student Request Processing Component 108 submits the data to the Matching Component 110. The Matching Component 110 runs the data against the Winning ML Model/Analysis Engine 120, takes the results (optimally ordered Teacher ID's for this student request) and stores them in Match Results 114. Note that "optimally ordered" here and throughout refers to teacher IDs ordered by each teacher that can teach this student most effectively. The Matching Component 110 checks the Teacher Availability component 112 for each Teacher ID in the results and builds a report of optimally ordered teachers and their availability, which gets returned to the Student Request Process Component 108. From there this report is returned to the Student User Interface component 104. The student can then use the Student User Interface component 104 to view the teacher matches and select their desired teacher/time slot. They can also update/modify/delete existing requests and teacher reservations.

The Teacher User Interface component 106 can be one of a myriad of technologies, including a web user interface, and app that runs on phones/tablets/other devices, APIs, etc. This component is used by teachers for two main purposes. The first purpose is to create, update, and delete a teacher's availability data. Availability data typically includes specific geographic locations a teacher can teach at (or online), the courses/subject material a teacher can teach, and the timeslots a teacher has available. The Teacher User Interface component 106 writes this data to the Teacher Availability component 112.

The second purpose of the Teacher User Interface component 106 is to present professional development reports/dashboards to a teacher indicating opportunities the teacher may have to broaden the diversity of students the teacher would be matched to as an optimal teacher. A teacher requests to view the reports/dashboards through the Teacher User Interface component 106, which then kicks off the request to the PD Opportunities Analysis Component 116. The PD Opportunities Analysis Component 116 retrieves the unmatched students for the teacher from the Match Results component 114 and combines this data with the corresponding student data in the Historical Student Biographical Data component 132. The PD Opportunities Analysis Component 116 runs a statistical analysis on this combined data, matches the results with known teacher professional development resources, and returns this data in report/dashboard format to the Teacher User Interface component 106.

Figure 2:
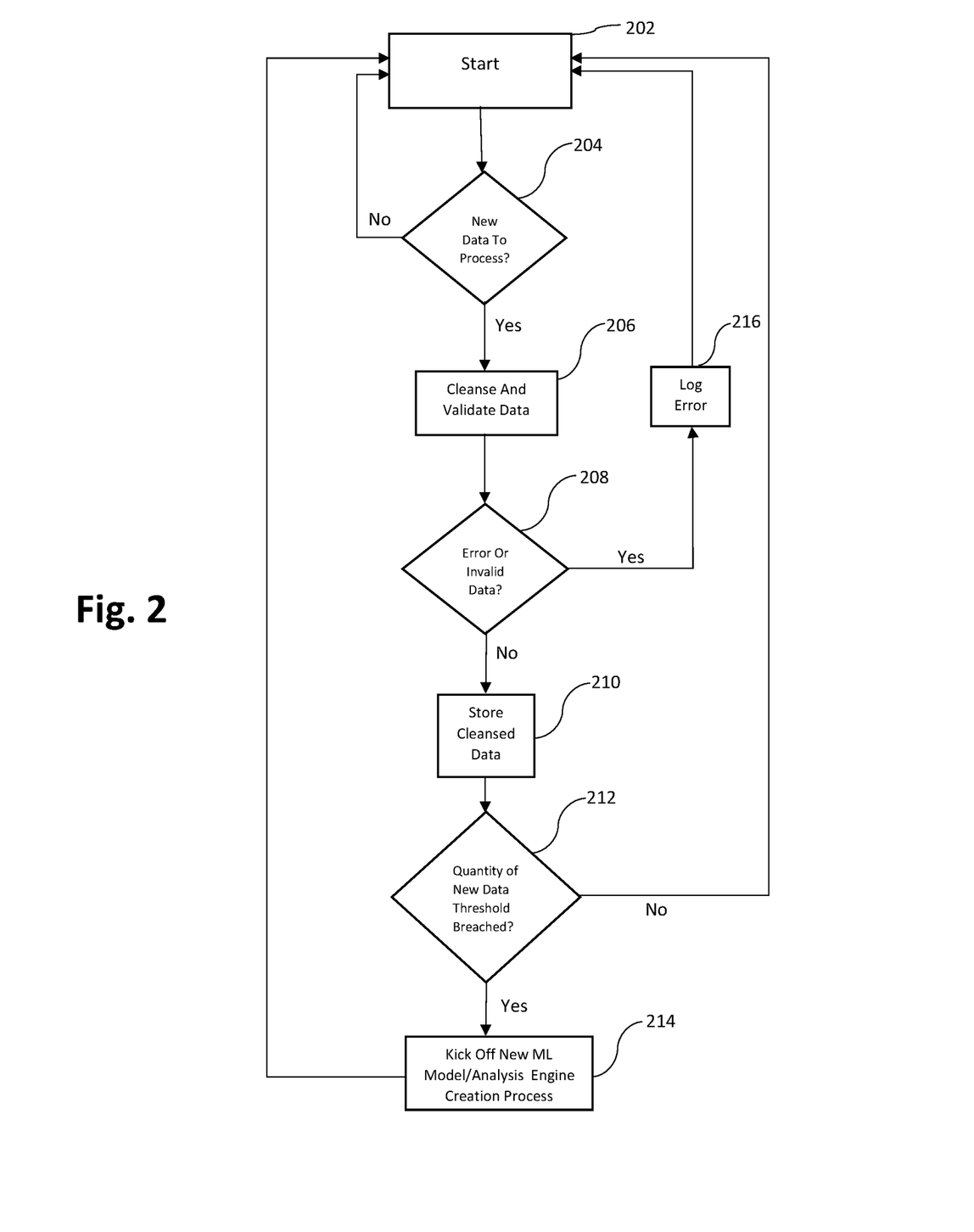
FIG. 2 is a flowchart illustrating a process of ingesting new data and kicking off the process of creating a new analysis engine/ML model.

FIG. 2 describes a method of ingesting new data and kicking off the process of creating a new ML Model/analysis engine. Operation of the flow starts at step 202 and immediately passes to step 204. At step 204 a determination is made on whether there is new data to process. Data can include a large plurality of categories, including teacher biographical data, historical student outcome data, historic student biographical data, etc. Indicators of new data to process can be discovered in a plurality of ways, including new files appearing in a folder, new rows existing in a data receiving database, an event being triggered by an API, etc. If there is no new data detected in step 204, flow moves back to step 202. Otherwise, if new data is detected, flow moves to step 206.

At step 206 the new data is cleansed and validated. This step includes mapping of the new data to an expected format. Flow then moves to step 208. If the new data is invalid based on the format expected or if an error occurs while processing it, flow moves to step 216 where the error is logged and the data is flagged for follow up, and the flow then moves back to step 202. If there are no errors or invalid data in step 208, flow moves to step 210. At step 210, the cleansed and validated data is stored for future retrieval. Note that storage could be done in a plurality of different ways, including by key/value pairs, in an object database, in a graph database, in a delimited file, in a relational database, etc. Flow then moves to step 212.

At step 212, a determination is made on whether a threshold has been breached for the quantity of new data. This threshold can be set to any value or by using any mathematical expression. For example, the threshold could be set to 1 indicating that if there is a single new piece of data then the threshold is breached. In another example, the threshold could be set to a mathematical calculation of the percentage of new data compared to the amount of existing data. If the threshold is not breached, flow passes back to step 202. If the threshold is breached flow passes to step 214.

At step 214, the new ML model/analysis engine creation process is kicked off. This can be done in a plurality of ways, including through marking a record in a database, by firing off an event, by placing a file in a directory, etc. After the process is kicked off, flow returns to step 202.

Figure 3:
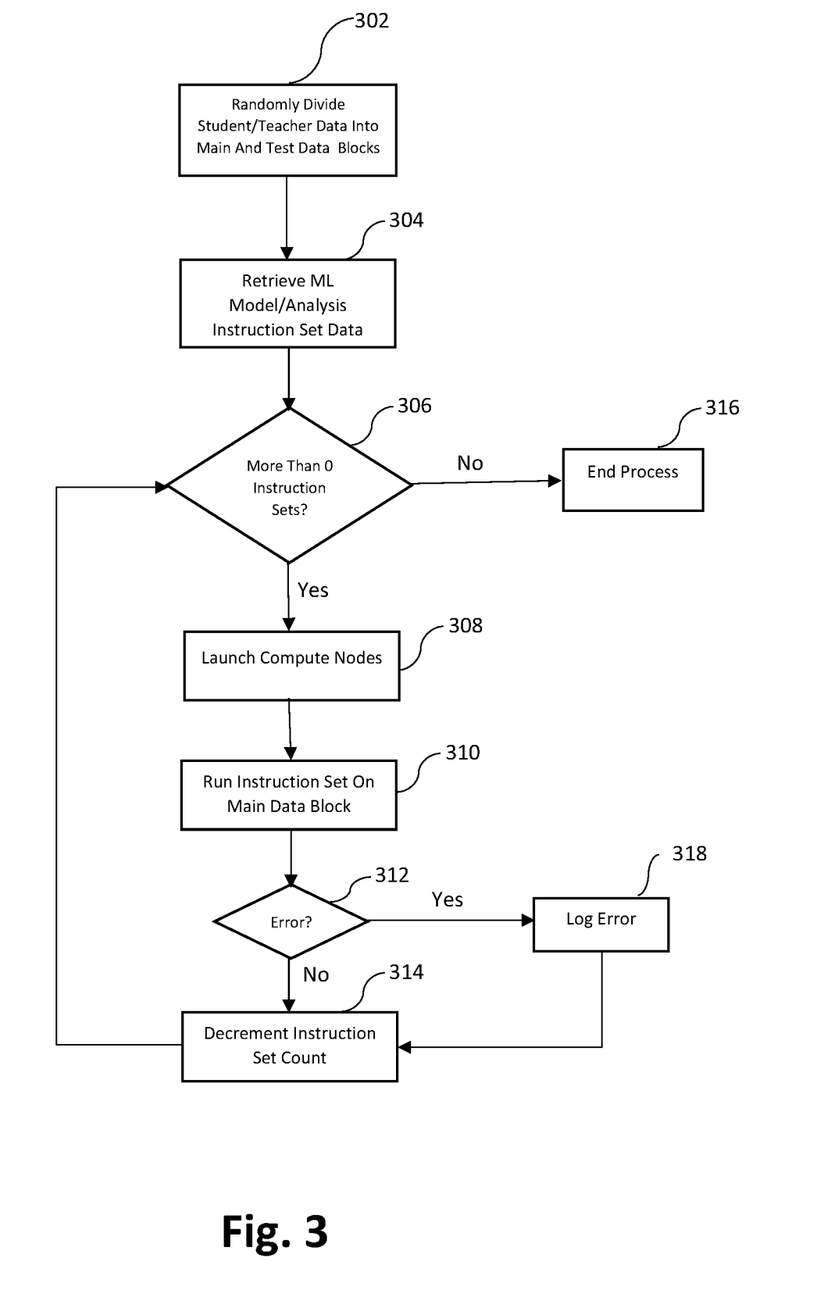
FIG. 3 is a flowchart illustrating a process of automatically building new analysis engines/ML models.

FIG. 3 describes a method of automatically building new ML Models/analysis engines. As mentioned in the summary, ML models can be constructed by a plurality of algorithms, including linear regression, support vector machine, naïve bayes, logistic regression, K-nearest neighbors, decision trees, random forest, gradient boosted decision trees, K-means clustering, hierarchical clustering, DBSCAN clustering, artificial neural networks, deep learning, etc., and the method defined in this application supports all types of algorithms. Analysis engines refers to any non-machine learning based algorithm that can be used to determine probabilistic outcomes. Analysis engines can be source code, object code, executables, etc.

Operation of the flow for FIG. 3 starts at step 302. At step 302, the student and teacher data that was previously ingested through the method in FIG. 2 is first randomized and then divided into main and test blocks of data. The main data block of data is used to create prospective ML models or analysis engines, and the test block of data is used to determine the performance and accuracy of the new ML model or new analysis engine. Flow then moves to step 304.

At step 304, the instruction sets for how to build each new ML model and/or analysis engine are retrieved from storage. Note that an instruction set contains all the information necessary to successfully create and test new ML models and analysis engines. Examples of information in an instruction set are the algorithm(s) to be employed in building a ML model, the type and quantity of compute nodes necessary to build a ML model or analysis engine, how to execute the code for an analysis engine, etc.

After step 304, flow then moves to step 306. At step 306, the number of instruction sets retrieved from step 304 are examined. If the number of instruction sets is zero, flow moves to step 316 which ends the process. If the number of instruction sets is greater than zero, flow moves to step 308.

At step 308, the first instruction set is parsed and read, and the amount and type of compute nodes indicated in the instruction set are launched. Compute nodes can be a plurality of different types, including virtual machines, containers, bare metal hardware, quantum computers, etc. Flow then passes to step 310.

At step 310, the portion of the instruction set that describes how to build the new ML model or analysis engine is executed on the launched compute nodes, using the main data block as the data source. Flow then passes to step 312 where errors are detected. If an error occurs, flow them moves to step 318 where the error is logged and then on to step 314. If there is no error detected in step 312, then flow moves directly to step 314. At step 314, the instruction set count is decremented by 1 and flow moves back to step 306.

Figure 4:
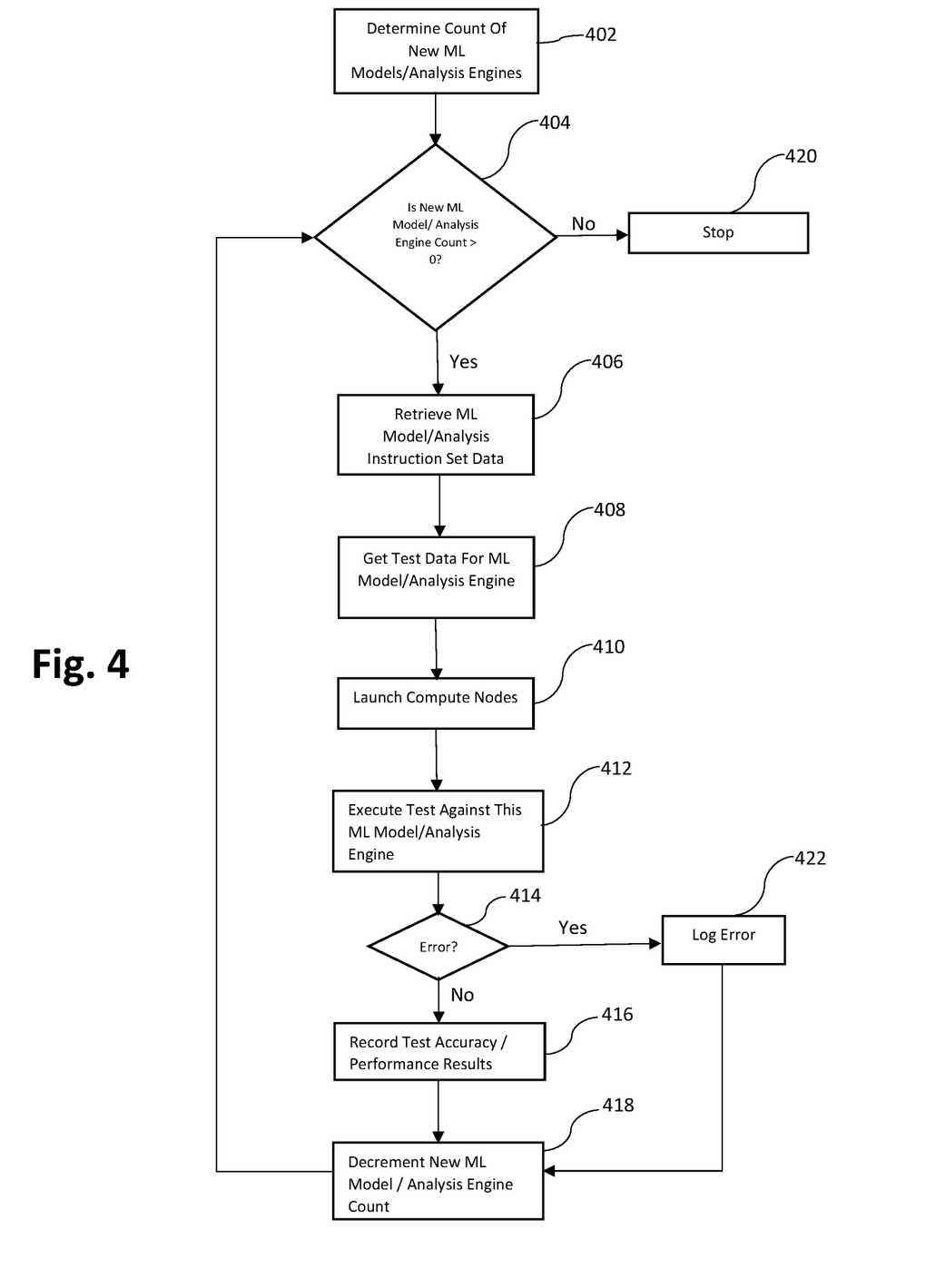
FIG. 4 is a flowchart illustrating a process of testing the accuracy of newly built analysis engines/ML models.

FIG. 4 describes a method of testing the performance and accuracy of newly built ML models/analysis engines. Note that the terms "performance" and "accuracy" here and throughout mean how good a ML model or analysis engine is at determining the optimal teacher for a given student. Typical metrics that can be used are precision, accuracy, F1 Score, recall, ROC curve, mean squared error, etc. The embodiment of the invention described allows for a plurality of metrics to be used for performance and accuracy, including distinct values and mathematical expressions.

Operation of the flow starts at step 402 where a check is performed to determine if there are any new ML models/analysis engines. Flow then passes to step 404. At step 404, if the count of new ML models/analysis engines is zero, flow passes to step 420, which ends the process. If the count is greater than zero, flow passes to step 406.

At step 406, the instruction set data for the first new ML model/analysis engine is retrieved and parsed. Recall that an instruction set contains all the information necessary to successfully create and test new ML models and analysis engines. Flow then passes to step 408.

At step 408, the test data block, created in step 302, for this ML model or analysis engine is retrieved based off of the information in the instruction set. Flow then passes to step 410. At step 410, the instruction set information pertaining to how and what type of compute nodes to launch for performance/accuracy testing of the ML model/analysis engine is read, and the corresponding compute nodes are launched. Flow then passes to step 412.

At step 412, the instruction set information pertaining to how to test this ML model/analysis engine is read and used to execute performance and accuracy tests against the ML model/analysis engine. Typically, performance and accuracy tests are performed using the data in the test data block (data with known ground truth outcomes) and running this against the new ML Model/analysis engine which was built using the main data block from step 302. Note that while this a typical testing methodology, the embodiment of the invention described allows for the flexibility of a plurality of different testing methods to be used to determine performance and accuracy. Flow then passes to step 414.

At step 414, a check is made to determine if any errors occurred while testing the new ML model/analysis engine. If an error did occur, flow passes to step 422 where the error is logged and then flow passes to step 418. If there were no errors while testing the new ML model/analysis engine, flow passes to step 416.

At step 416, the results of the performance and accuracy tests are recorded. Flow then moves to step 418 where the count of new ML models/analysis engines is decremented, and flow then moves back to step 404.

Figure 5:
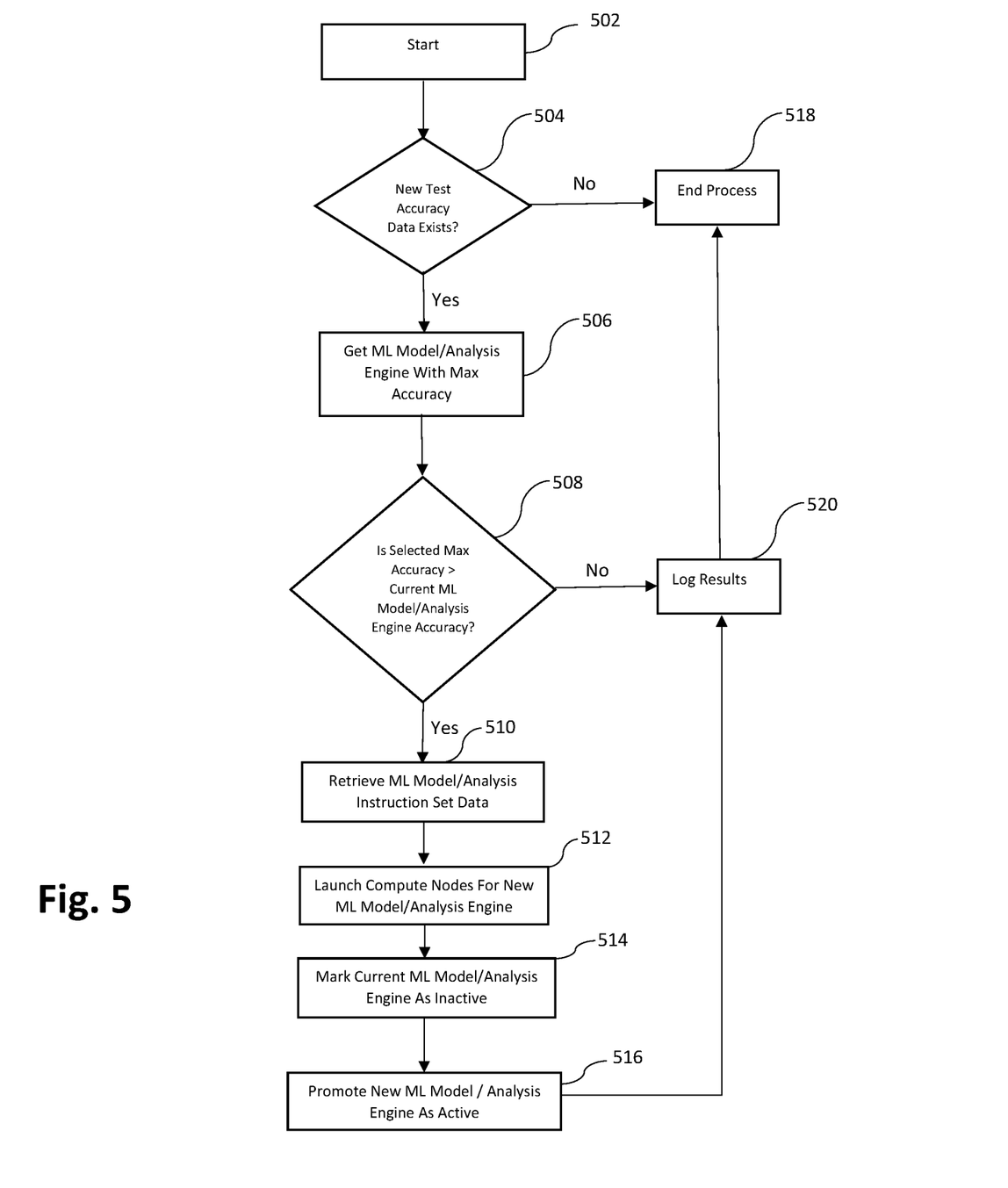
FIG. 5 is a flowchart illustrating a process for determining if a new analysis engine/ML model is more accurate than the current one.

FIG. 5 describes a method of determining if a new ML model/analysis engine is more accurate than the current one. Flow starts at step 502 and immediately passes to step 504. At step 504, a check is made to see if any new ML model/analysis engine performance/accuracy data exists from the tests performed as described in FIG. 4. If no new performance/accuracy data exists, flow moves to step 518 where the process ends. If new performance/accuracy data does exist, flow moves to step 506.

At step 506, the new performance/accuracy data with the best score(s) is selected. "Best score(s)" here and throughout refers to the ML model or analysis engine that will achieve the most optimal teacher matches. Flow then passes to step 508.

At step 508, the results obtained from step 506 are compared to the performance/accuracy data of the current ML model/analysis engine being used. If the results are less performant/accurate than the current ML model/analysis engine, flow moves to step 520 where the results of the comparison are logged and flow is then passed to step 518, ending the process. If the performance/accuracy results obtained in step 506 are more performant/accurate than the current ML model/analysis engine, flow moves to step 510.

At step 510, the instruction set data associated with the new ML model/analysis engine that step 508 determined outperformed the current ML model/analysis engine is retrieved and parsed. Flow then moves to step 512. At step 512, the amount and type of compute nodes indicated in the instruction set are launched. Flow moves to step 514.

Note that Step 514 and step 516 are completed as part of a transaction. A "transaction" here and throughout means that if the activities of a single step within the entire operation fail, all changes to data, configurations, or systems associated with each step are rolled back/restored to their original values. At step 514, the current active ML model/analysis engine is marked inactive (a data saving operation), and flow moves to step 516. At step 516, the new ML model/analysis engine identified in step 508 is marked active (a data saving operation) and moved to the compute nodes launched in step 512. Flow then moves to step 520 where the results are logged and then flow moves to step 518, ending the process.

Figure 6:
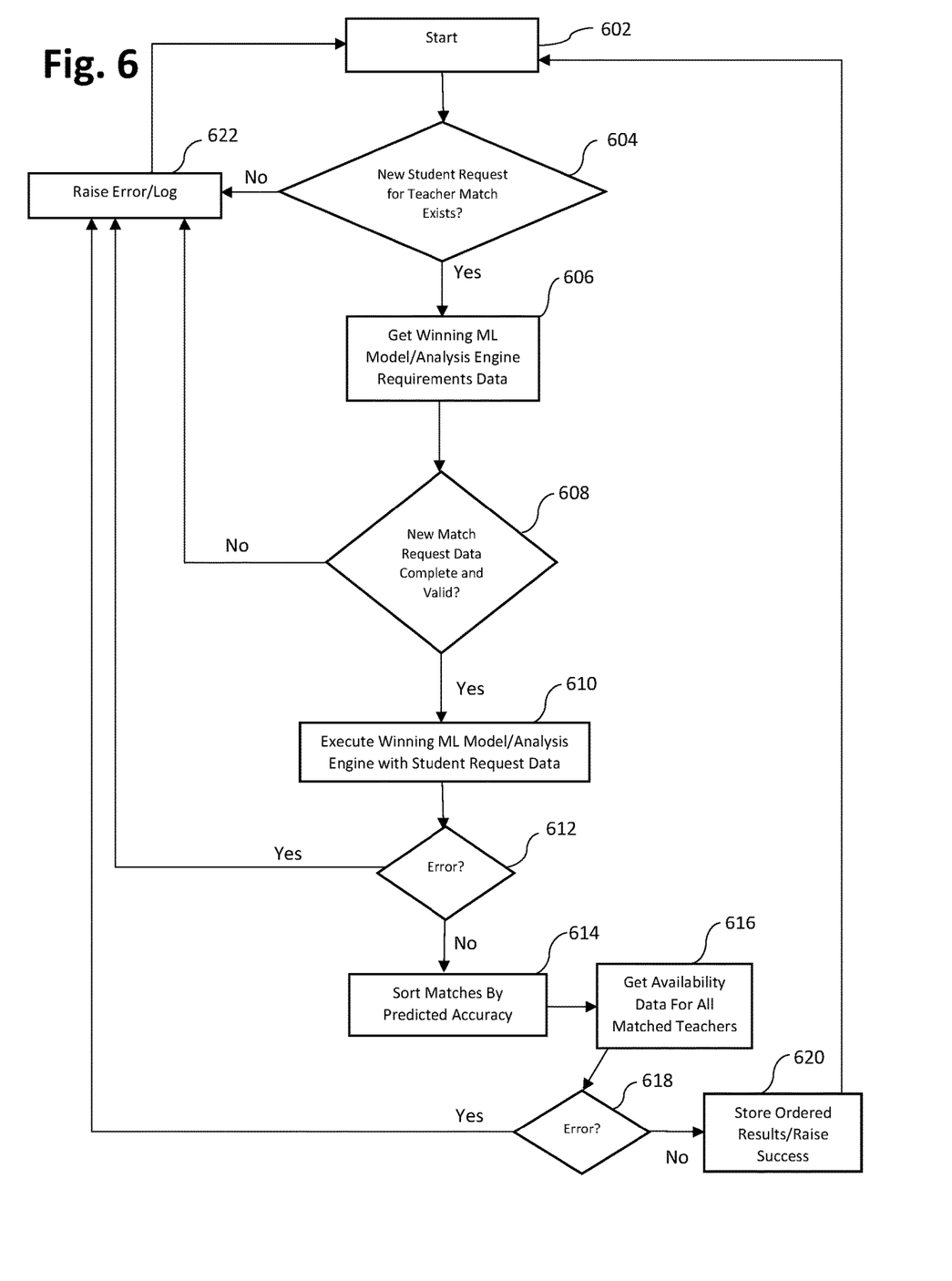
FIG. 6 is a flowchart illustrating a process of taking a student request for a teacher match and returning ordered results.

FIG. 6 describes a method of taking a student request for a teacher match and returning ordered results. Flow starts at step 602 and immediately passes to step 604. At step 604, a check is made to determine if there is a request from a student to be matched with a teacher. Note that requests could originate from a plurality of different techniques, including a web user interface, an application residing on a phone or tablet, an API call, etc. The embodiment of the invention described supports any interface that allows data to be passed in and corresponding results returned. If no student request to be matched with a teacher exists, flow moves to step 622 where the attempt is logged and then flow passes back to step 602. If a student request to be matched with a teacher does exist, flow then moves to step 606.

At step 606 the winning ML model/analysis engine requirements data is retrieved. Note that the term winning here and throughout refers to the current ML model/analysis engine that returns the most optimal results for matching students to teachers. The requirements data for the winning ML model/analysis engine refers to the quantity, format, and type of information necessary to successfully execute the winning ML model/analysis engine against a new student request for an optimal teacher. Flow then moves to step 608.

At step 608, the data from the new student request to be matched with a teacher is compared to the required information from the ML model/analysis engine requirements data. If any data in the student request is incomplete or not valid, flow moves to step 622 where an error is raised to the requestor and logged, and then flow moves back to step 602. If the student request data is complete and valid, flow then moves to step 610.

At step 610, the new student request data is executed against the current winning ML model/analysis engine. Flow then moves to step 612. At step 612, a check is made to see if an error occurred during the ML model/analysis engine execution in step 610. If an error did occur, flow moves to step 622 where an error is raised to the requestor and logged, and then flow moves back to step 602. If an error did not occur, flow then moves to step 614.

At step 614, the results returned from the execution of the current winning ML model/analysis engine with the student request data are sorted by their predicted accuracy as determined by the current winning ML model/analysis engine. Results data from the current winning ML model/analysis engine consists of unique teacher IDs and predicted accuracy (likelihood of optimal match) for each teacher ID. Note that the scope and broadness of the student request for an optimal teacher may result in few optimal matches with teachers or many optimal matches. Flow then moves to step 616.

At step 616, for each teacher ID returned in step 610, the availability of each teacher is retrieved. Flow then moves to step 618. At step 618 a check is made to determine if there was an error while retrieving the teacher availability data. If an error did occur, flow moves to step 622 where an error is raised to the requestor and logged, and then flow moves back to step 602. If an error did not occur, flow then moves to step 620.

At step 620, the ordered optimal teacher results with corresponding availability are stored in a consumable format, and an event is raised to notify the requestor that results are available for consumption. Consumable format can be one of a plurality of formats, including detailed reports, graphs, dashboards, delimited, JSON, XML, etc. Flow then passes back to step 602.

Figure 7:
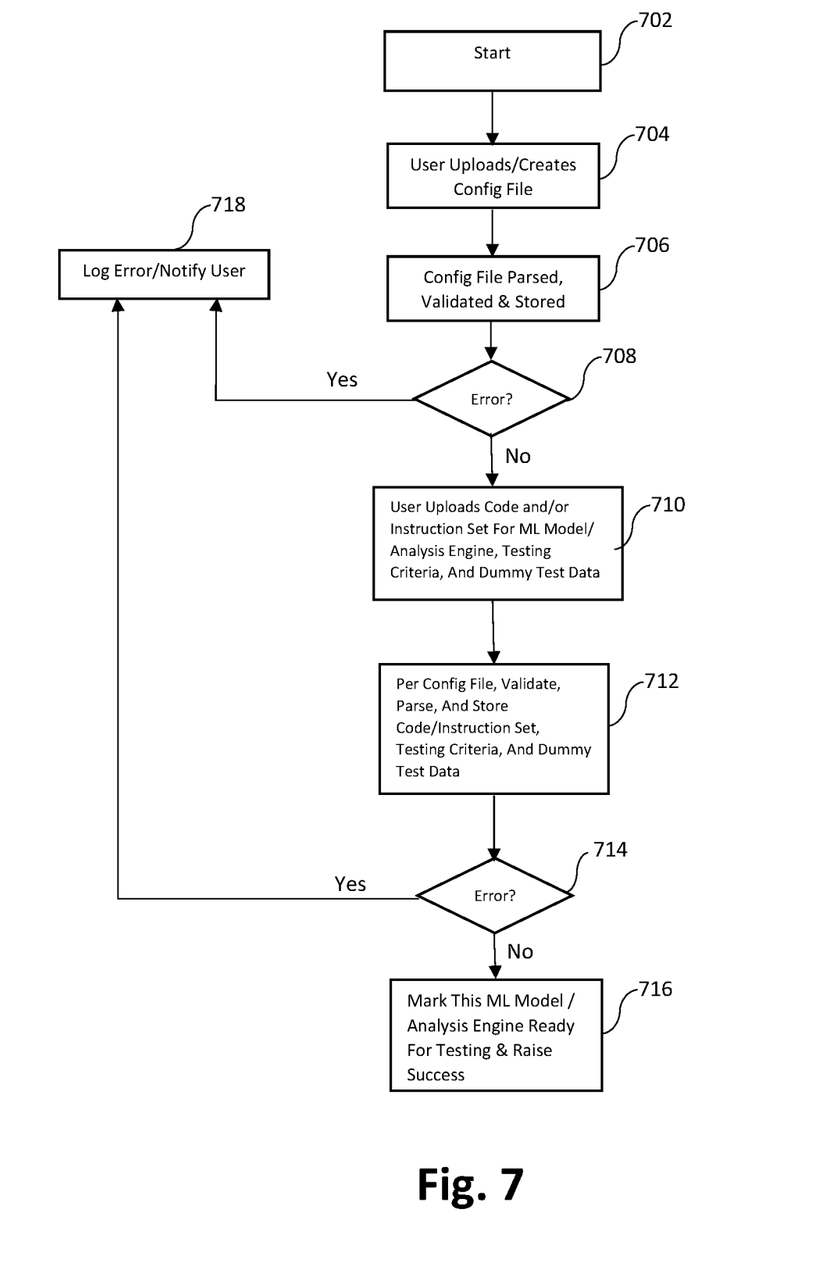
FIG. 7 is a flowchart illustrating a process of creating a new prospective analysis engine or ML model and incorporating it into the workflow.

FIG. 7 describes a method of creating a new prospective analysis engine or ML model and incorporating it into the overall workflow. Flow starts at step 702 and immediately passes to step 704. At step 704, the user creates and uploads a configuration file that contains information about the prospective new ML model/analysis engine they wish to construct and test. Examples of information contained within the configuration file are type (ML model, executable based analysis engine, etc.), descriptions of the data and objects that will be required for creation of the prospective new ML model/analysis engine, name of ML model/analysis engine, description of ML model/analysis engine, etc. Note that here and throughout, users can create and upload necessary data and objects through a plurality of techniques, including a web user interface, an application residing on a phone or tablet, an API call, etc. The embodiment of the invention described supports any interface that allows data/objects to be passed in and corresponding results returned. Flow then passes to step 706.

At step 706, the uploaded configuration file is parsed, validated, and stored. Flow then passes to step 708. At step 708, a check is made to see if an error occurred during the processing of the configuration file in step 706. If an error did occur, flow moves to step 718 where an error is raised to the requestor and logged, and then flow moves back to step 702. If an error did not occur, flow then moves to step 710.

At step 710, the user uploads the necessary objects and data for the prospective new ML model/analysis engine they want to create and test. Objects and data typically include source code, object code, executable code, instruction sets for ML models/analysis engines, testing criteria, dummy test data, etc. Flow then moves to step 712.

At step 712, the configuration file uploaded in step 704 is read and used to validate, parse, and store the data and objects uploaded in step 710. Flow then passes to step 714.

At step 714, a check is made to see if an error occurred during the processing of the objects and data uploaded in step 710. If an error did occur, flow moves to step 718 where an error is raised to the requestor and logged, and then flow moves back to step 702. If an error did not occur, flow then moves to step 716.

At step 716, the new prospective ML model/analysis engine is marked ready for testing and an event is raised to notify the user of success.

Figure 8:
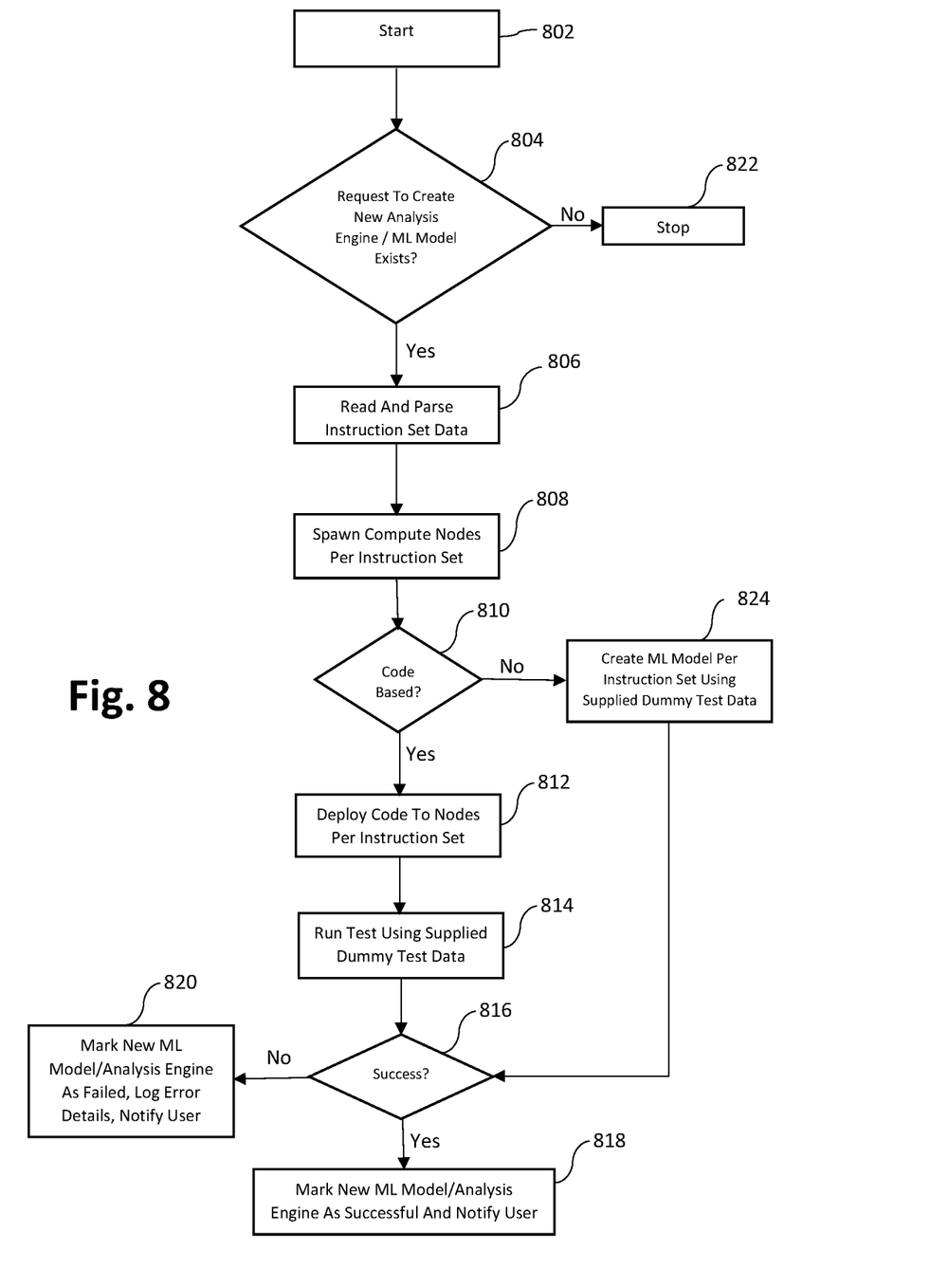
FIG. 8 is a flowchart illustrating a process of running and testing a new prospective analysis engine or ML model.

FIG. 8 describes a method of running and testing a new prospective analysis engine or ML model. Flow starts at step 802 and is immediately passed to step 804. At step 804 a check is made to determine if there is a request from a user to create and test a prospective new ML model/analysis engine. Note that requests could originate from a plurality of different techniques, including a web user interface, an application residing on a phone or tablet, an API call, etc. The embodiment of the invention described supports any interface that allows data to be passed in and corresponding results returned. If no request to create a new ML model/analysis engine exists, flow moves to step 822 where the process stops. If a request does exist, flow then moves to step 806.

At step 806, the instruction set specific to the request in step 804 is read and parsed. Flow then moves to step 808. At step 808, the type and quantity of compute nodes as specified in the instruction set are spawned. Flow then moves to step 810.

At step 810, the instruction set is read to determine if this prospective new ML model/analysis engine is code based (source, object, executable, etc.). If it is not code based, flow moves to step 824. At step 824, the instruction set is followed to create the new prospective ML model using the dummy test data uploaded in step 710 on the spawned compute nodes from step 808. Flow then moves to step 816.

If in step 810 it is determined that this prospective new ML model/analysis engine is code based, flow moves to step 812. At step 812, the code uploaded in step 710 is deployed to the compute nodes spawned in step 808. Flow then moves to step 814. At step 814, tests are run against the code uploaded in step 710 using the supplied dummy test data uploaded in step 710. Flow then moves to step 816.

At step 816, a check is made to see if the ML model from step 824 was created successfully or if the analysis engine deployed in step 812 was created and tested successfully. If not successful, flow moves to step 820 where the prospective new ML model/analysis engine is marked as failed, the error details are logged, and the user is notified. If the check from step 816 indicated success, then flow moves to step 818 where the new ML model/analysis engine is marked as successful and the user is notified.

Figure 9:
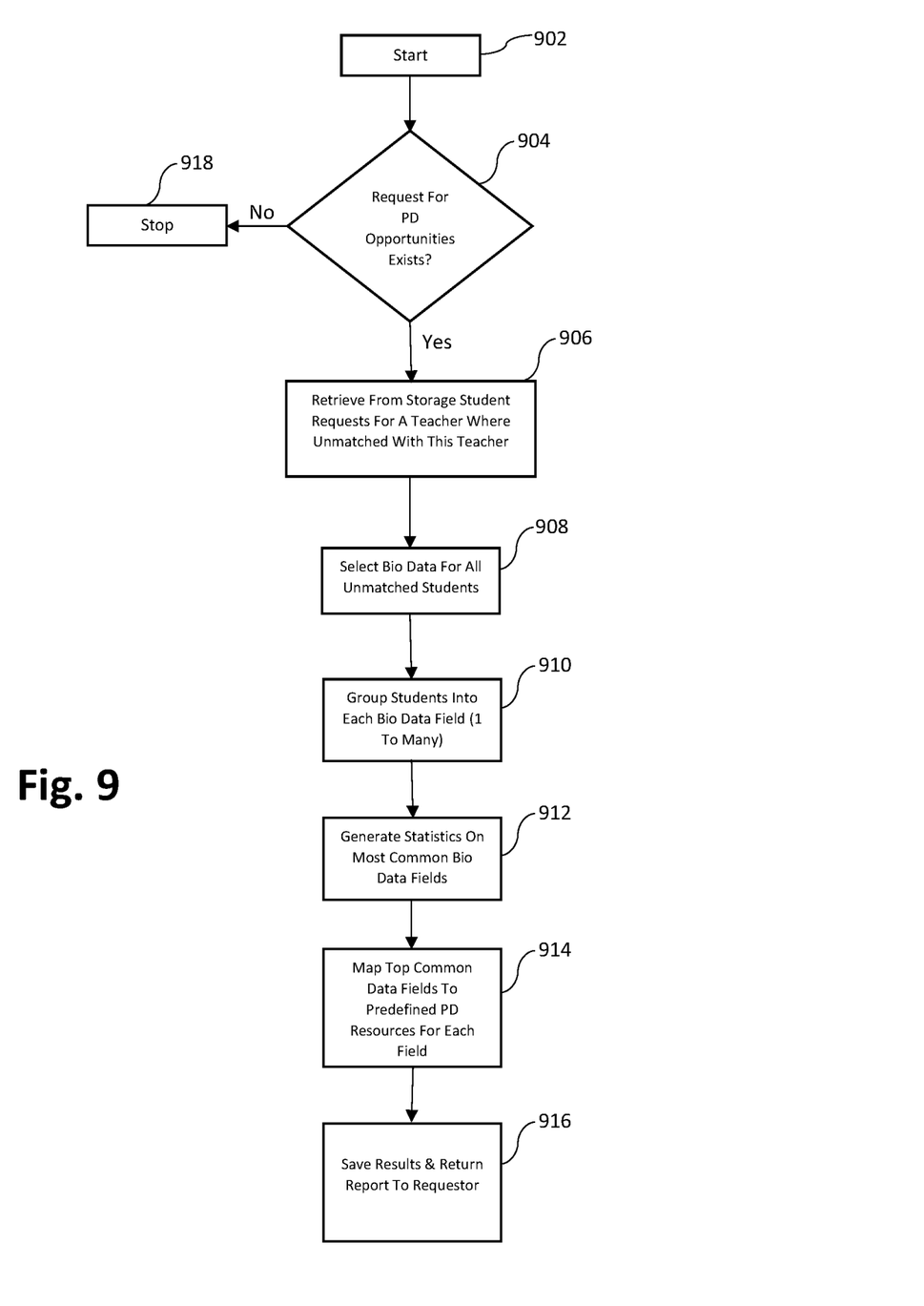
FIG. 9 is a flowchart illustrating a process of determining and presenting to teachers opportunities to expand the types of students they can optimally teach.

FIG. 9 describes a method of determining and presenting to teachers opportunities to expand the types of students they can optimally teach. Flow starts at step 902 and is immediately passed to step 904. At step 904 a check is made to determine if there is a request from a user to receive professional development (PD) opportunities. Users are typically teachers, trainers, administrative personnel on behalf of teachers or trainers, etc. Note that requests could originate from a plurality of different techniques, including a web user interface, an application residing on a phone or tablet, an API call, etc. The embodiment of the invention described supports any interface that allows data to be passed in and corresponding results returned. If no request to receive PD opportunities exists, flow moves to step 918 where the process stops. If a request does exist, flow then moves to step 906.

At step 906, the previous student requests for an optimal teacher that could have matched this teacher but did not are retrieved. Flow then moves to step 908. At step 908, biographical and demographic data for each of the students who were unmatched to this teacher is retrieved. Flow then moves to step 910. At step 910, the unmatched students are grouped by each data field that they have in common. Flow then moves to step 912.

At step 912, common statistical methods are used across the grouped data in step 910 to determine patterns. Examples of common statistical methods are histograms, median, Chi-squared, ANOVA, Pearson correlation, cluster analysis, etc. Note that the embodiment of the invention described allows for any statistical method to be used that can be formulated as one or more mathematical expressions. Flow then passes to step 914.

At step 914, any common data fields that present themselves from the statistical analysis in step 912 are mapped to corresponding PD resources. PD resources could be videos on teaching specific types of students, curriculum examples, informative articles, courses for teachers/trainers, etc. Note that the embodiment of the invention described allows for any PD resources to be used as long as they have the ability to be stored or referenced. Flow then moves to step 916.

At step 916, the combined results of steps 912 and 914 are returned to the requester in a consumable format. Consumable format can be one of a plurality of formats, including detailed reports, graphs, dashboards, delimited, JSON, XML, etc.

The invention claimed is:

1. A computer implemented method for identifying the optimal teachers for a student, the method comprising:
using a processor of a server computer, the server computer communicatively connected to one or more data electronic interfaces, receiving input data from a plurality of different sources where the input data consists of teacher historical data, teacher biographical data, student historical data, student learning style data, or student biographical data;
cleansing, validating and storing the input data;
distributing a first query in real time to retrieve instruction sets from an analysis algorithms datastore;
spawning the quantity and type of compute nodes as specified in the instruction sets;
creating automatically a plurality of machine learning models and analysis engines on the compute nodes with the input data per the instruction sets comprising:
creating prospective new machine learning models and analysis engines using the processor of the server computer, the server computer communicatively connected to a modeler client electronic interface for a modeler to request creating the prospective new machine learning model or analysis engine, the modeler request specifying one or more configuration files, dummy test data sets, source code or object code or executable code, machine learning models, machine learning algorithms, or instruction sets;
parsing, validating, and storing the data contained in the modeler request by the modeler client electronic interface; spawning automatically the quantity and the type of compute nodes based on the configuration file;
creating automatically the prospective machine learning model or analysis engine based on the configuration files and the instruction sets;

testing automatically the prospective new machine learning model or analysis engine using the dummy test data sets;

causing in response to the modeler request from the modeler client electronic interface a rendering or a listing of the results or the errors from the creation and the testing of the prospective machine learning model or analysis engine;

testing automatically the plurality of machine learning models and analysis engines and storing accuracy and performance results;

determining automatically from the accuracy and performance results which of the plurality of machine learning models and analysis engines is most accurate and promoting the most accurate to become the winning machine learning model or analysis engine;

using the processor of the server computer, the server computer communicatively connected to one or more client electronic interfaces for the student to request matches for one or more of the optimal teachers, the student request specifying one or more subject areas, the student biographical data, or the student learning style data;

distributing a second query in real time based on the student request from the client electronic interfaces to the winning machine learning model or analysis engine and receiving a result set of the optimal teachers in response to the second query;

causing in real time in response to the student request from the client electronic interface rendering of an interactive display of the optimal teachers.

2. The computer implemented method of claim 1, further comprising ordering the result set of the optimal teachers by optimization level.

3. The computer implemented method of claim 1, further comprising creating automatically the plurality of machine learning models and analysis engines based off of when a quantity threshold of the input data is reached.

4. The computer implemented method of claim 1 further comprising establishing teacher availability by using the processor of the server computer, the server computer communicatively connected to a teacher client electronic interface for a teacher to request viewing or updating of teaching availability, the teacher request specifying a transaction type of update, view, or delete and date availability data;

distributing a process in real time based on the teacher request from the teacher client electronic interface to a teacher availability datastore and receiving a result set of current or changed availability data;

causing in real time in response to the teacher request from the teacher client electronic interface a rendering or listing of an interactive display of the teacher's teaching availability.

5. The computer implemented method of claim 1, further comprising augmenting the optimal teachers with their corresponding availability by querying in real time a teacher availability datastore.

6. The computer implemented method of claim 1, further comprising providing teachers professional development (PD) opportunities by using the processor of the server computer, the server computer communicatively connected to a PD client electronic interface for the teacher to request the PD opportunities, the PD request specifying a teacher ID;

distributing a third query in real time based on the PD request from the PD client electronic interface to a historical matching results datastore and receiving a PD result set of students that were not matched with the teacher ID;

analyzing automatically with statistical methods the PD result set of students to determine commonalities;

mapping automatically the commonalities to corresponding PD resources;

causing in real time in response to the PD request from the PD client electronic interface a rendering or a listing of the PD resources and visual representations of the commonalities.

7. A tangible, non-transitory computer readable medium storing instructions that, when executed by one or more servers, causes the one or more servers to perform a computer-implemented machine learning or analysis engine based matching of teachers to students method, the method comprising:

receiving input data from a plurality of different sources where the input data consists of teacher historical data, teacher biographical data, student historical data, student learning style data, or student biographical data;

cleansing, validating and storing the input data;

distributing a first query in real time to retrieve instruction sets from an analysis algorithms datastore;

spawning automatically the quantity and the type of compute nodes as specified in the instruction sets;

creating automatically a plurality of machine learning models and analysis engines on the compute nodes with the input data per the instruction sets comprising:

storing instructions that when executed by one or more servers creates prospective new machine learning models and analysis engines by allowing a modeler to request creating the prospective new machine learning model or analysis engine, the modeler request specifying one or more configuration files, dummy test data sets, source code or object code or executable code, machine learning models, machine learning algorithms, or instruction sets;

parsing, validating, and storing the data contained in the modeler request;

spawning the quantity and the type of compute nodes based on the configuration file;

creating automatically the prospective machine learning model or analysis engine based on the configuration files and the instruction sets;

testing automatically the prospective new machine learning model or analysis engine using the dummy test data sets;

causing in response to the modeler request a rendering or a listing of the results or the errors from the creation and the testing of the prospective machine learning model or analysis engine;

testing automatically the plurality of machine learning models and analysis engines and storing accuracy and performance results;

determining automatically from the accuracy and performance results which of the plurality of the machine learning models and analysis engines is most accurate and promoting the most accurate to become the winning machine learning model or analysis engine;

receiving a student request to determine matches to one or more optimal teachers, the student request specifying one or more subject areas, the student biographical data, or the student learning style data;

distributing a second query in real time based on the student request to the winning machine learning model or analysis engine and receiving a result set of the optimal teachers in response to the second query;

causing in real time in response to the student request an interactive display of the optimal teachers.

8. The tangible, non-transitory computer readable medium of claim 7 wherein storing instructions that when executed by one or more servers causes ordering the result set of the optimal teachers by optimization level.

9. The tangible, non-transitory computer readable medium of claim 7 wherein storing instructions that when executed by one or more servers creates automatically the plurality of machine learning models and analysis engines based off of when a quantity threshold of the input data is reached.

10. The tangible, non-transitory computer readable medium of claim 7 wherein storing instructions that when executed by one or more servers establishes teacher availability by allowing a teacher to request viewing or updating of teaching availability, the teacher request specifying a transaction type of update, view, or delete and date availability data;

distributing a process in real time to a teacher availability datastore and receiving a result set of current or changed availability data;

causing in real time in response to the teacher request a rendering or listing of an interactive display of the teacher's teaching availability.

11. The tangible, non-transitory computer readable medium of claim 7 wherein storing instructions that when executed by one or more servers augments the result set of the optimal teachers with their corresponding availability by querying in real time a teacher availability datastore.

12. The tangible, non-transitory computer readable medium of claim 7 wherein storing instructions that when executed by one or more servers provides teachers professional development (PD) opportunities by allowing for the teacher to request the PD opportunities, the PD request specifying a teacher ID;

distributing a third query in real time based on the PD request from the teacher to a historical matching results datastore and receiving a PD result set of students that were not matched with the teacher ID;

analyzing automatically with statistical methods the PD result set of students to determine commonalities;

mapping automatically the commonalities to corresponding PD resources;

causing in real time in response to the PD request from the teacher a rendering or a listing of the PD resources and visual representations of the commonalities.

\* \* \* \* \*